United States Patent
Yokono et al.

(10) Patent No.: US 12,417,097 B2
(45) Date of Patent: *Sep. 16, 2025

(54) ACCELERATOR CONTROL SYSTEM, ACCELERATOR CONTROL METHOD AND ACCELERATOR CONTROL PROGRAM

(71) Applicant: NIPPON TELEGRAPH AND TELEPHONE CORPORATION, Tokyo (JP)

(72) Inventors: Tomoya Yokono, Musashino (JP); Yoshiro Yamabe, Musashino (JP); Teruaki Ishizaki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/287,193

(22) PCT Filed: Apr. 22, 2021

(86) PCT No.: PCT/JP2021/016314
§ 371 (c)(1),
(2) Date: Oct. 17, 2023

(87) PCT Pub. No.: WO2022/224410
PCT Pub. Date: Oct. 27, 2022

(65) Prior Publication Data
US 2024/0201986 A1    Jun. 20, 2024

(51) Int. Cl.
*G06F 9/30* (2018.01)
*G06F 9/28* (2006.01)

(52) U.S. Cl.
CPC .............. *G06F 9/28* (2013.01); *G06F 9/3001* (2013.01); *G06F 9/30043* (2013.01); *G06F 2209/509* (2013.01)

(58) Field of Classification Search
CPC ...... G06F 9/28; G06F 9/3001; G06F 9/30043; G06F 2209/509
See application file for complete search history.

(56) References Cited

U.S. PATENT DOCUMENTS 11,221,848 B2 *   1/2022   Maiyuran ............... G06F 17/16
11,281,609 B2 *   3/2022   Kaneko ................. G06F 9/3836
(Continued)

FOREIGN PATENT DOCUMENTS

JP    2019-149086 A    9/2019
JP    2020-537235 A    12/2020
WO   2019/073193 A1    4/2019

OTHER PUBLICATIONS

Yang et al., "When Poll is Better than Interrupt", FAST, vol. 12, Available Online at: https://www.usenix.org/system/files/conference/fast12/yang.pdf, 2012, pp. 1-7.
(Continued)

*Primary Examiner* — Corey S Faherty
(74) *Attorney, Agent, or Firm* — XSENSUS LLP (57) ABSTRACT

An accelerator control system includes an accelerator control device and an accelerator, wherein the accelerator control device includes first processing circuitry configured to store control data including a location of data which is an arithmetic processing target and information specifying content of arithmetic processing of the accelerator, and determine completion of the arithmetic processing by the accelerator when the control data which has been subjected to the arithmetic processing by the accelerator is stored in a storage, and the accelerator includes second processing circuitry configured to acquire the control data from the storage, perform arithmetic processing on the data which is an arithmetic processing target according to the location of the data which is an arithmetic processing target and information specifying content of arithmetic processing of the
(Continued)

accelerator included in the acquired control data, and store the control data in the storage when the arithmetic processing is completed.

15 Claims, 10 Drawing Sheets

(56) References Cited

U.S. PATENT DOCUMENTS

2019/0042091 A1* 2/2019 Raghunath ........... G11C 29/028
2024/0202033 A1* 6/2024 Yokono ................ G06F 9/5038

OTHER PUBLICATIONS

"CUDA Toolkit Documentation v11.2.2", NVIDIA, Available Online at: https://docs.nvidia.com/cuda/, Retrieved from the net on: Mar. 29, 2021, 1 page.
Gulati et al., "GPU Architecture and the CUDA Programming Model", Hardware acceleration of EDA algorithms, Available Online at: https://link.springer.com/content/pdf/10.1007%2F978-1-4419-0944-2_3.pdf, 2010, pp. 23-30.
Matthias Noack, et al., "Heterogeneous Active Messages for Offloading on the NEC SX-Aurora TSUBASA", 2019 IEEE International Parallel and Distributed Processing Symposium Workshops (IPDPSW), May 20, 2019, 10 pages, XP033583415.
Lena Oden, et al., "Infiniband-Verbs on GPU: a case study of controlling an Infiniband network device from the GPU", 2014 IEEE 28th International Parallel & Distributed Processing Symposium Workshops, May 19, 2014, 8 pages, XP032696287.

* cited by examiner

ACCELERATOR CONTROL SYSTEM, ACCELERATOR CONTROL METHOD AND ACCELERATOR CONTROL PROGRAM

CROSS-REFERENCE TO RELATED APPLICATION

The present application is based on PCT filing PCT/JP2021/016314, filed Apr. 22, 2021, the entire contents of which are incorporated herein by reference.

TECHNICAL FIELD

The present invention relates to an accelerator control system, an accelerator control method and an accelerator control program.

BACKGROUND ART

Conventionally, technology for increasing a processing speed by incorporating arithmetic accelerators into an arithmetic processing system is known. Since it is difficult to improve the operating frequency of a processor and to highly integrate arithmetic units due to the limitation of semiconductor microfabrication technology, processing is offloaded to an accelerator in a specialized manner for specific processing by this technology, and high-performance calculation is realized (refer to NPL 1 to 3).

Specifically, a CPU performs control for driving an accelerator via an API for the accelerator and a device driver, and the accelerator reads processing data copied to a kernel memory space, and performs arithmetic processing which takes time to be executed by the CPU. Further, the accelerator notifies the CPU of completion of processing by hardware interruption after execution of the arithmetic processing.

CITATION LIST

Non Patent Literature

[NPL 1] J. Yang, D. B. Minturn, F. Hady, "When Poll is Better than Interrupt," FAST, vol. 12, pp. 3-3, [online], 2012, [Retrieved on Mar. 29, 2021], Internet <URL: usenix.org/system/files/conference/fast12/yang.pdf>
[NPL 2] "CUDA Toolkit Documentation v11.2.2, [online], NVIDIA, [Retrieved on Mar. 29, 2021], Internet <URL::// ocs.nvidia.com/cuda/>
[NPL 3] K. Gulati, S. P. Khatri, "GPU Architecture and the CUDA Programming Model," Hardware acceleration of EDA algorithms, pp. 23-30, [online], Springer, [Retrieved on Mar. 29, 2021], Internet <URL:://ink.springer.com/content/pdf/10.1007% 2F978-1-4419-0944-2_3.pdf>

SUMMARY OF INVENTION

Technical Problem

However, in the conventional technology, it is sometimes difficult to increase the speed of real-time processing using accelerators. For example, since accelerators are controlled by the CPU, each time processing such as writing of data to an accelerator, execution of arithmetic operation, or reading of data is performed, interrupt notification of exclusive control and processing completion is generated. In addition, a memory copy occurs in a user space and a kernel space for reading and writing data. Such processing becomes an overhead and increases a delay time. When there are a plurality of accelerators, an overhead occurs in the same manner, and scalability is reduced. Therefore, it is difficult to use accelerators in the area of real-time processing.

The present invention has been made in view of the foregoing and an object thereof is to increase the speed of real-time processing using accelerators.

Solution to Problem

In order to solve the aforementioned problems and achieve the object, an accelerator control system includes an accelerator control device and an accelerator, wherein the accelerator control device includes: first processing circuitry configured to: store control data including a location of data which is an arithmetic processing target and information specifying content of arithmetic processing of the accelerator; and determine completion of the arithmetic processing by the accelerator when the control data which has been subjected to the arithmetic processing by the accelerator is stored in a storage, and the accelerator includes: second processing circuitry configured to: acquire the control data from the storage; perform arithmetic processing on the data which is an arithmetic processing target according to the location of the data which is an arithmetic processing target and information specifying content of arithmetic processing of the accelerator included in the acquired control data; and store the control data in the storage when the arithmetic processing is completed.

Advantageous Effects of Invention

According to the present invention, it is possible to increase the speed of real-time processing using accelerators.

DESCRIPTION OF EMBODIMENTS

An embodiment of the present invention will be described in detail below with reference to the drawings. Note that the present invention is not limited to the embodiment. Furthermore, the same constituent elements are denoted by the same reference numerals in the description of the drawings.

[Configuration of Accelerator Control System]

Figure 1:
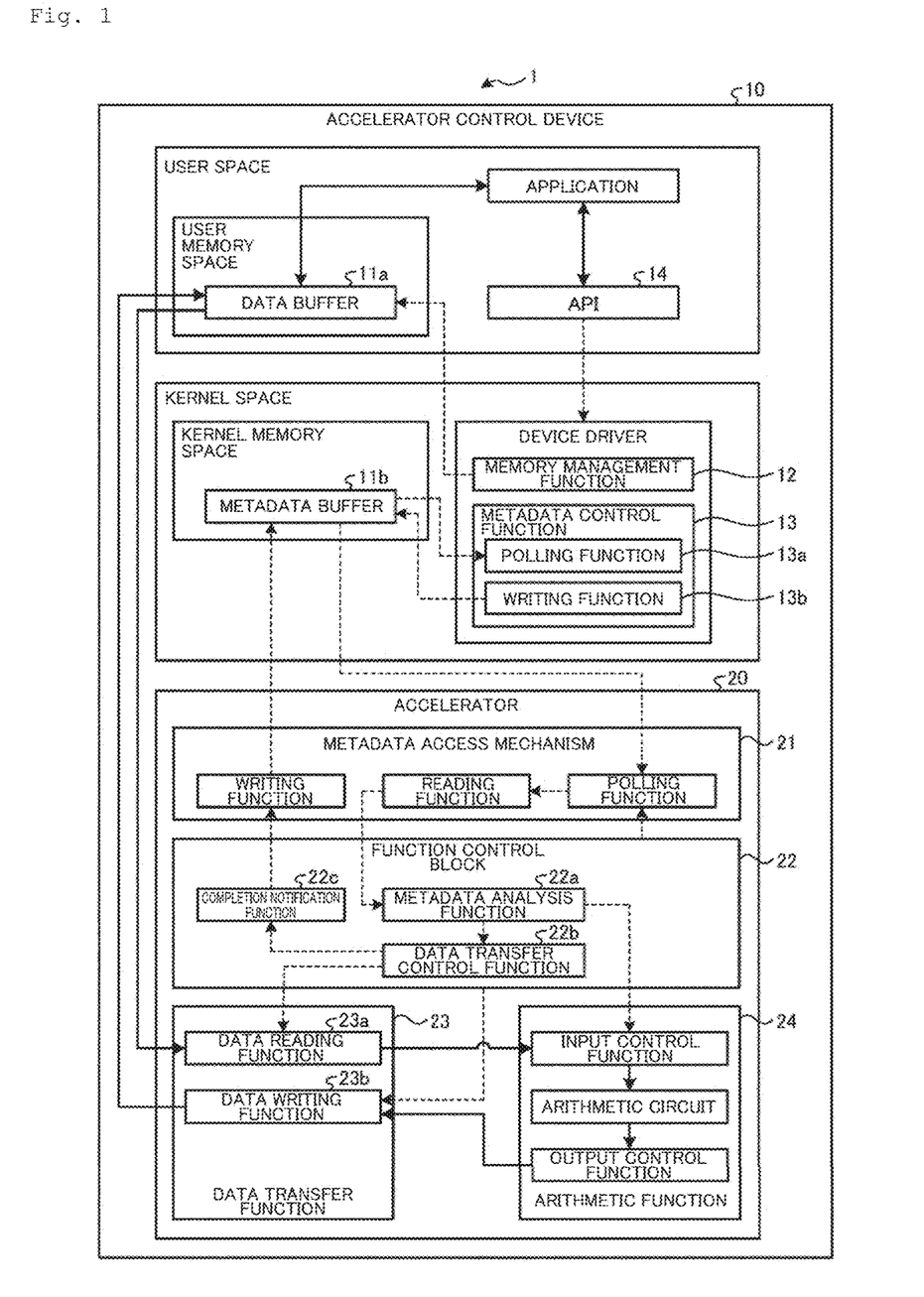
FIG. 1 is a schematic diagram illustrating an overall configuration of an accelerator control system of the present embodiment.

FIG. 1 is a schematic diagram illustrating an overall configuration of an accelerator control system of the present embodiment. As shown in FIG. 1, the accelerator control system 1 includes an accelerator control device 10 and an accelerator 20. The accelerator control device 10 and the accelerator 20 can communicate data with each other via a communication line such as bus wiring, for example.

The accelerator control device 10 is an information processing device realized using a general-purpose processor such as a central processing unit (CPU). In the accelerator control device 10, an application which is processing defined by a user is executed in a user space. In addition, operation and management of a physical device such as the accelerator 20 and abstraction processing of the physical device in user space processing are performed in a kernel space.

A user memory space and a kernel memory space are realized by a semiconductor memory element such as a random access memory (RAM) or a flash memory, or a storage device such as a hard disk or an optical disc and serve as a storage unit. A processing program for operating the accelerator control device 10, data used during execution of the processing program, and the like are stored in advance or stored temporarily each time processing is performed in the storage unit.

A control unit realized using a general-purpose processor serves as each functional unit such as a memory management function 12 and a metadata control function 13 of a device driver, or an API 14 which will be described later by executing the processing program stored in the memory, as illustrated in FIG. 1. Note that the control unit may include another functional unit that is not shown.

In the accelerator control device 10, data that is an arithmetic processing target (hereinafter also referred to as processing data) is disposed in a data buffer 11a of the user memory space on the user space. Further, control data (hereinafter also referred to as metadata) including the location of data that is an arithmetic processing target and information specifying the content of arithmetic processing of an accelerator is disposed in a metadata buffer 11b of the kernel memory space in the kernel space.

The accelerator 20 is an arithmetic accelerator realized by a graphics processing unit (GPU), a field programmable gate array (FPGA), a data processing unit (DPU) or the like, and as illustrated in FIG. 1, serves as functional units such as a metadata access mechanism 21, a function control block 22, a data transfer function 23, and an arithmetic function 24.

The accelerator 20 reads processing data and metadata to realize offload of arithmetic processing. Specifically, the accelerator 20 monitors whether or not metadata is disposed in the metadata buffer 11b according to autonomous polling. When the metadata is disposed therein, the accelerator 20 reads the disposed metadata, analyzes it, and drives the accelerator 20. In addition, the accelerator 20 stores the result of arithmetic processing performed on the processing data in the data buffer 11a.

The accelerator control device 10 can proceed to the next processing asynchronously with the accelerator 20. The accelerator 20 disposes the metadata in the metadata buffer 11b when the arithmetic processing is completed. Accordingly, the accelerator control device 10 considers that the arithmetic processing has been completed. Further, the accelerator control device 10 acquires the result of arithmetic processing performed on the processing data from the data buffer 11a and proceeds to the next processing.

Specifically, the accelerator control device 10 determines the operation of the accelerator 20 by arranging metadata including the location of processing data and the content of arithmetic processing in the metadata buffer 11b in the kernel memory space through the metadata control function 13 mounted in the device driver.

The accelerator control device 10 creates a data buffer 11a which can be referred to by the accelerator control device 10 and the accelerator 20 in the user memory space via the memory management function 12, and disposes the processing data.

The accelerator 20 has a metadata access mechanism 21. The metadata access mechanism 21 has a function of polling the metadata buffer 11b in the kernel memory space, a function of reading metadata, and a function of writing metadata into the metadata buffer, and can autonomously read metadata without depending on an explicit control signal from the accelerator control device 10.

The accelerator 20 is notified of information such as an address of the metadata buffer 11b by an accelerator initialization function at the time of loading the device driver.

The accelerator 20 reads metadata from a metadata buffer 11b, and a metadata analysis function 22a analyzes the data and operates according to the description. The accelerator 20 drives a data reading function 23a in the data transfer function 23 on the basis of information on the address and length of the processing data included in the metadata, reads the processing data from the data buffer 11a, and uses it for an arithmetic operation in the arithmetic function 24. In the arithmetic function 24, arithmetic processing is executed on the basis of arithmetic information written in the metadata. The metadata analysis function 22a transfers the analysis result to the arithmetic function 24, and sets the content of arithmetic processing by the arithmetic function 24.

After arithmetic processing is completed, the result of arithmetic processing is transferred from the arithmetic function 24 to a data writing function 23b and written in a data buffer designated by a data transfer control function 22b. Thereafter, a notification indicating that data transfer is completed is transmitted from the data transfer function 23 to a completion notification function 22c, the metadata is written in the metadata buffer 11b by a writing function of the metadata access mechanism 21, and the operation of the accelerator 20 is completed.

In this manner, in the accelerator control system 1, metadata for controlling data transfer and arithmetic processing is disposed in a main memory, and the accelerator 20 autonomously performs polling and reading. Accordingly, an overhead of accelerator control such as interruption is reduced, and real-time processing can be performed.

In addition, since the accelerator 20 can directly transfer processing data to the user space of the accelerator control device 10 and the accelerator control device 10 and the accelerator 20 can be driven asynchronously, delay and CPU use rate are reduced.

Further, since the accelerator 20 can operate by accessing the main memory of the accelerator control device 10, extension to a plurality of accelerators 20 can be achieved and thus scalability is greatly improved.

Figure 2:
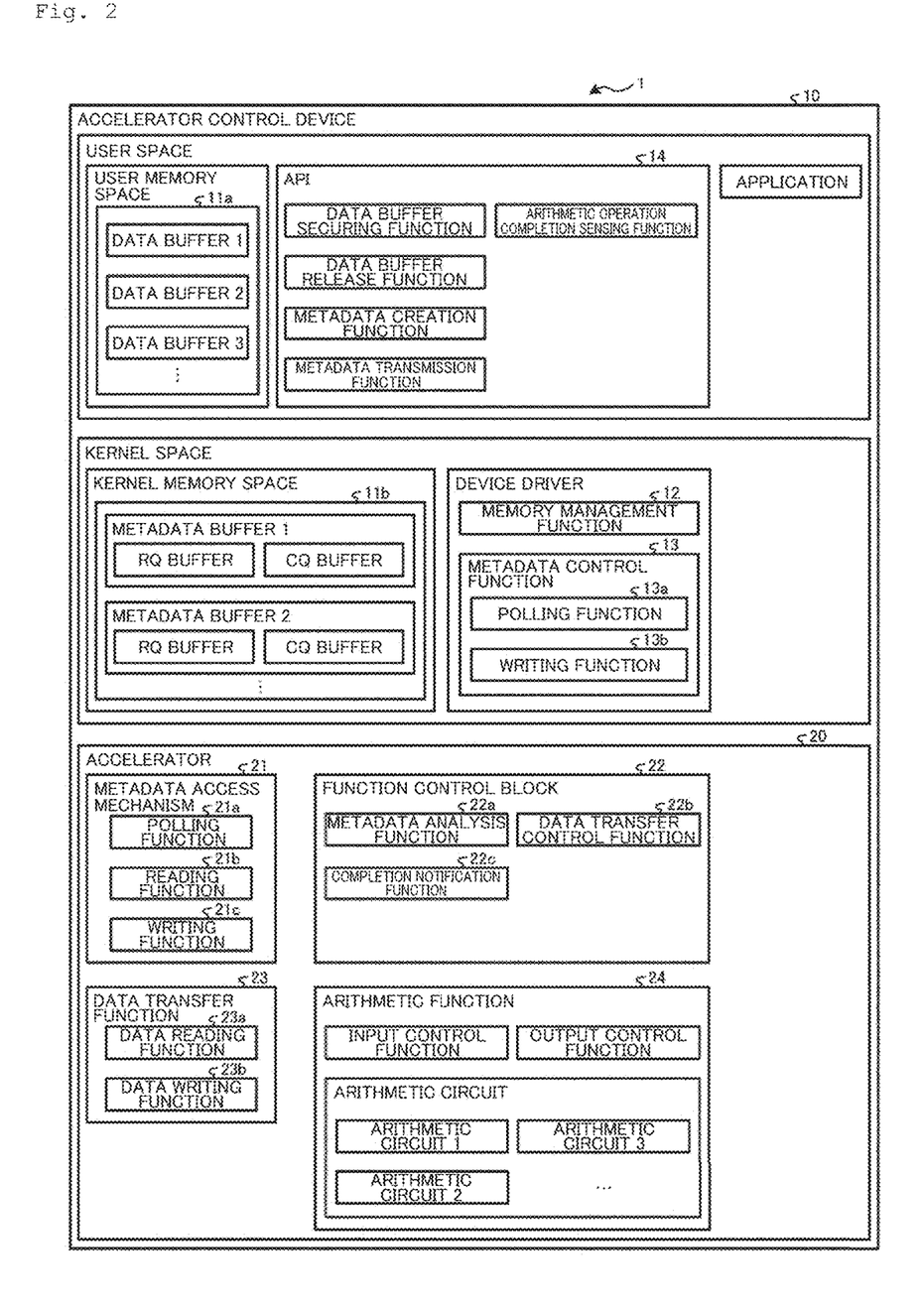
FIG. 2 is a diagram for describing the accelerator control system of the present embodiment.

[Accelerator Control Device] FIG. 2 is a diagram for describing the accelerator control system of the present embodiment. As illustrated in FIG. 2, in the accelerator control device 10, the API 14 is a group of functions that can be called through an application and provides functions necessary for the operation of the accelerator 20. For example, the API serves as a data buffer securing function, a data buffer releasing function, a metadata creation function, a metadata transmission function, and an arithmetic operation completion sensing function.

The data buffer securing function generates the data buffer 11a which is a storage area for transmitting/receiving data to/from the accelerator 20. The data buffer securing function calls the memory management function 12 and acquires area information of the data buffer 11a from the memory management function 12.

The data buffer release function deletes the data buffer 11a. The data buffer release function calls the memory management function 12, notifies of the area information of the data buffer 11a to be released, and releases the area.

The metadata creation function creates metadata that is control data to which control information of the accelerator 20 has been added. The metadata transmission function transmits the metadata created by the metadata creation function to the metadata control function 13. The arithmetic operation completion sensing function calls the metadata control function 13 and checks whether or not processing of an arbitrary accelerator 20 is completed according to a return value of the metadata control function 13.

The device driver is present in the kernel space and provides a function group such as the memory management function 12 and the metadata control function 13 for handling a specific device.

The memory management function 12 is called from the API 14 in the user space, and secures, releases and manages the area of the data buffer 11a.

The metadata buffer 11b is a storage area for transmitting/receiving metadata to/from the accelerator 20 and is generated depending on the number of accelerators 20 by an accelerator initialization function. For example, the metadata buffer 11b stores metadata including the location of data that is an arithmetic processing target and information specifying the content of arithmetic processing of the accelerator. Further, the metadata buffer 11b stores different metadata for each of the plurality of accelerators 20.

The metadata buffer 11b is composed of a request queue (RQ) buffer for transmitting metadata to the accelerator 20 and a completion queue (CQ) buffer for receiving metadata from the accelerator 20.

The metadata control function 13 is called from the API 14 in the user space and performs reading, writing and management with respect to the RQ buffer/CQ buffer of the metadata buffer 11b. The metadata control function 13 has a polling function 13a and a writing function 13b.

The polling function 13a polls the CQ buffer and checks completion of an arithmetic operation. That is, the polling function 13a serves as a determination unit to monitor whether or not metadata that has been subjected to arithmetic processing by the accelerator 20 is stored in the metadata buffer 11b. Then, the polling function 13a determines completion of the arithmetic processing by the accelerator 20 when the metadata that has been subjected to the arithmetic processing by the accelerator 20 has been stored in the metadata buffer 11b. Further, the writing function 13b writes data into the RQ buffer.

[Accelerator] In the accelerator 20, the metadata access mechanism 21 includes, as functions for accessing the metadata buffer 11b in the kernel space, a polling function 21a, a reading function 21b, and a writing function 21c.

The polling function 21a polls the RQ buffer of the metadata buffer 11b to check whether or not metadata is present in the RQ buffer. That is, the polling function 21a serves as a monitoring unit to monitor whether or not metadata is present in the metadata buffer 11b.

The reading function 21b serves as an acquisition unit to acquire metadata from the metadata buffer 11b. That is, the reading function 21b reads metadata and transfers it to the function control block 22 when the polling function 21a confirms that the metadata is present in the RQ buffer.

The writing function 21c writes metadata in the CQ buffer of the metadata buffer 11b. That is, the writing function 21c serves as a storage unit, and when arithmetic processing is completed, stores metadata in the metadata buffer 11b.

The function control block 22 controls sharing, driving and pause timing of necessary data for each functional unit of the accelerator 20. The function control block 22 includes the metadata analysis function 22a, the data transfer control function 22b, and the completion notification function 22c.

The metadata analysis function 22a extracts information on an operation, and the address and length of the data buffer 11a from metadata transmitted from the metadata access mechanism 21. The data transfer control function 22b provides a function for controlling reading and writing of data in the data transfer function 23. The completion notification function 22c transfers metadata to be written in the CQ buffer to the metadata access mechanism 21.

The arithmetic function 24 serves as an arithmetic unit to perform arithmetic processing on processing data according to information specifying the location of the processing data and the operation of the accelerator 20 included in the acquired metadata.

Specifically, the arithmetic function 24 includes an input control function, an arithmetic circuit, and an output control function. The arithmetic circuit has a plurality of independent arithmetic circuits and can define an arithmetic operation for each thereof. The input control function inputs data transmitted from the data reading function 23a of the data transfer function 23 to an appropriate arithmetic circuit on the basis of information on metadata transmitted from the function control block 22.

The output control function transfers the result of arithmetic processing performed on the processing data output from the arithmetic circuit to the data writing function 23b of the data transfer function 23 at appropriate timing.

The data writing function 23b of the data transfer function 23 serves as a storage unit to store the result of arithmetic processing performed on the processing data in the data buffer 11a.

Figure 3:
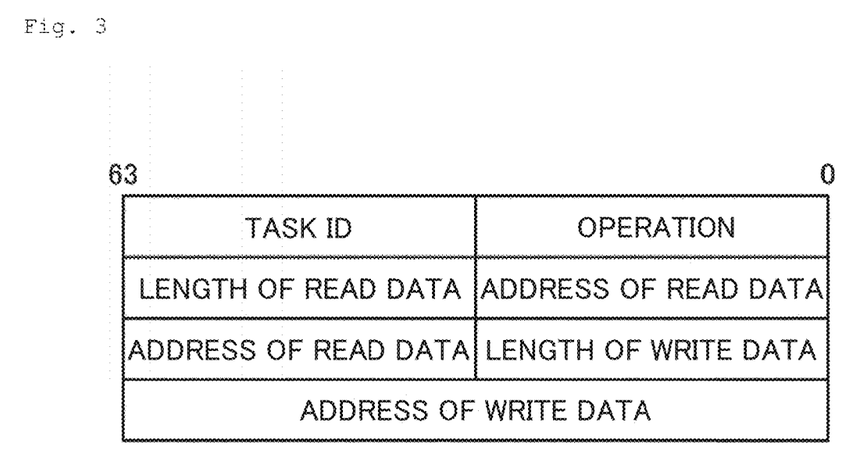
FIG. 3 is a diagram illustrating a data configuration of metadata.

Next, FIG. 3 is a diagram illustrating a data configuration of metadata. As shown in FIG. 3, the metadata is composed of a total of 256-bit data including a 32-bit task ID, a 32-bit operation, a 32-bit read data length, a 64-bit read data address, a 32-bit write data length, and a 64-bit write data address.

Figure 4:
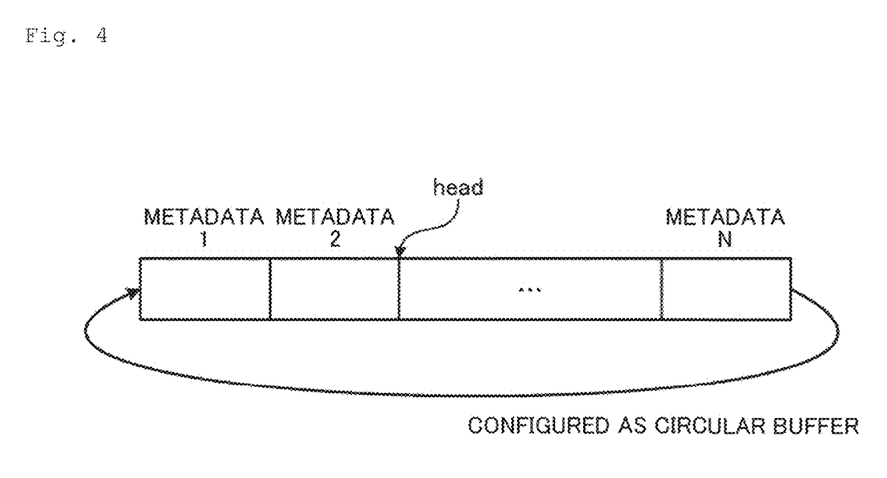
FIG. 4 is a diagram illustrating a structure of a metadata buffer.

FIG. 4 is a diagram illustrating the structure of the metadata buffer. As shown in FIG. 4, the metadata shown in FIG. 3 is stored in the RQ buffer/CQ buffer. Head information of the RQ buffer shown in FIG. 4 is controlled by the metadata control function 13. The metadata control function 13 forms the metadata transmitted from the metadata transmission function of the API 14 into the configuration shown in FIG. 3, stores the metadata in the RQ buffer, and then shifts the head information to the next position.

Similarly, with respect to the CQ buffer, the metadata control function 13 also reads metadata from the CQ buffer using the head information and shifts the head to the next position when called by the arithmetic operation completion sensing function of the API 14.

Figure 5:
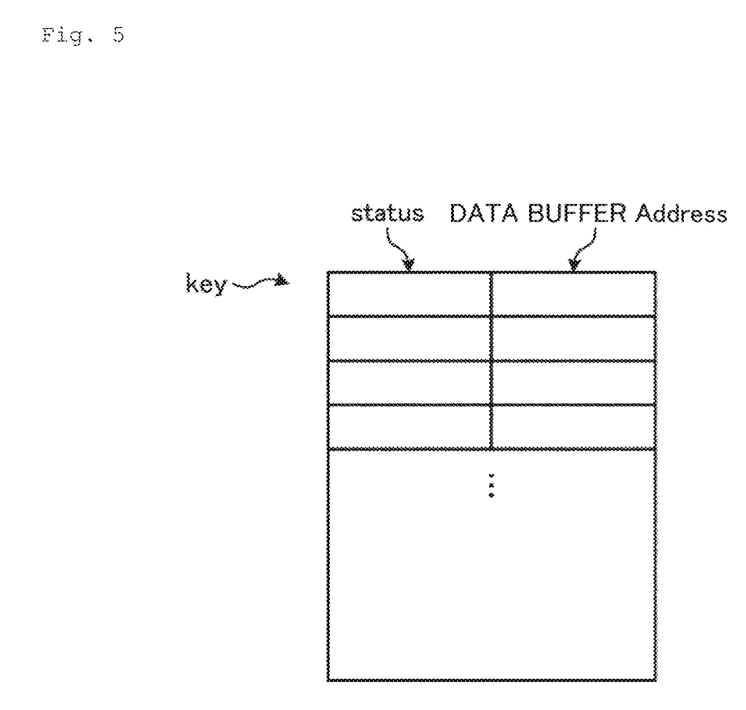
FIG. 5 is a diagram for describing a data buffer.

FIG. 5 is a diagram for describing the data buffer. The memory management function 12 manages the address and status of the data buffer 11a through a table illustrated in FIG. 5. As shown in FIG. 5, the physical address of the data buffer 11a and the status of the address are managed through the table. At the time of setting metadata for the accelerator 20, a physical address of a desired data buffer 11a is acquired and a read data address and a write data address are set by referring to a key. Accordingly, differences between virtual addresses in the kernel space and the user space can be absorbed and managed.

Figure 6:
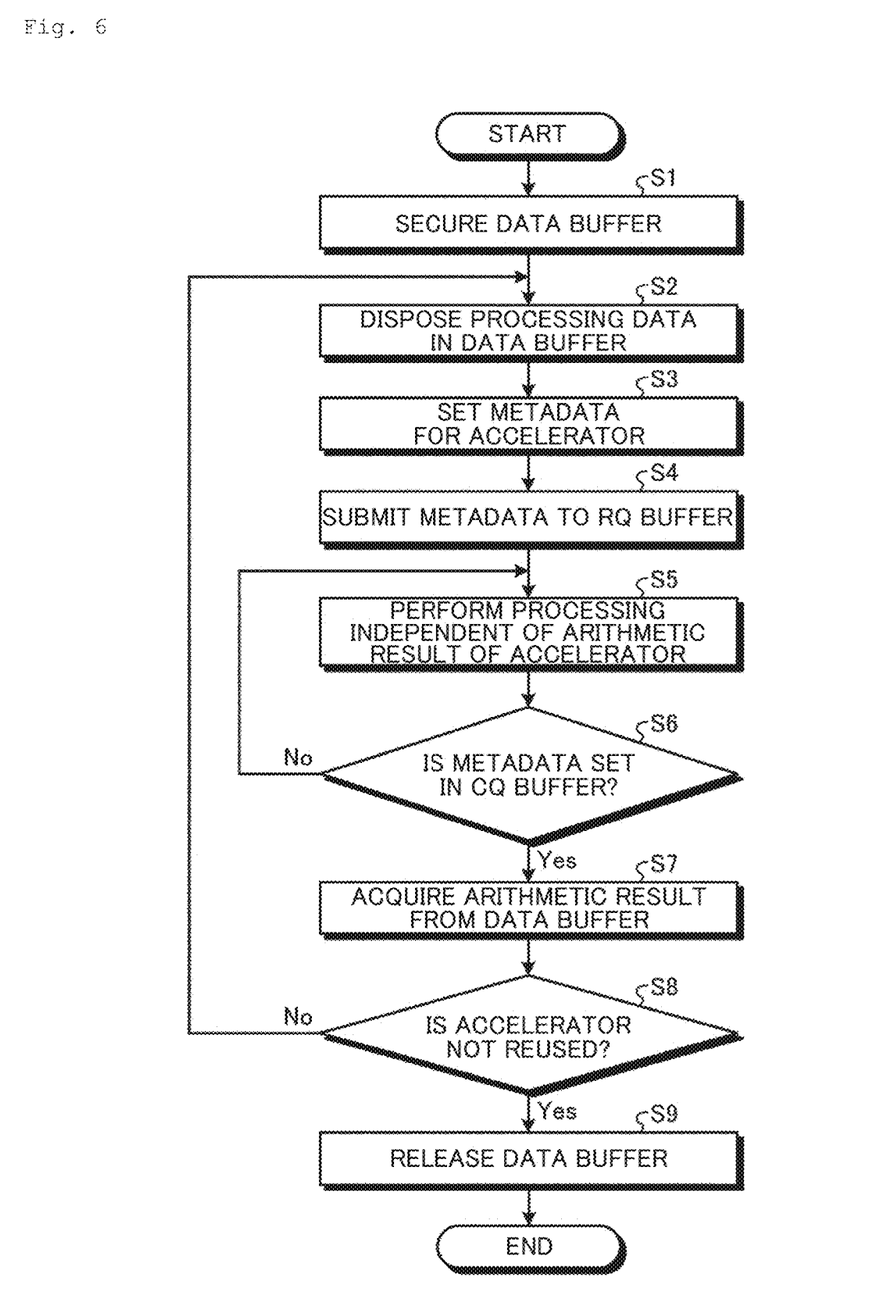
FIG. 6 is a flowchart showing an accelerator control processing procedure in an accelerator control device.

[Accelerator Control Processing] Next, accelerator control processing performed by the accelerator control system 1 according to the present embodiment will be described with reference to FIG. 6 to FIG. 8. FIG. 6 is a flowchart showing an accelerator control processing procedure in the accelerator control device 10. The flowchart of FIG. 6 is started at a timing at which, for example, an application instructs starting.

First, the accelerator control device 10 secures the data buffer 11a (step S1). The accelerator control device 10 stores (disposes) processing data to be transferred to the accelerator 20 in the data buffer 11a (step S2).

The accelerator control device 10 sets information on metadata (step S3) and submit the information to an RQ buffer of the metadata buffer 11b (step S4). Then, the accelerator control device 10 executes processing independent of the arithmetic result of the accelerator 20 (step S5).

When the accelerator control device 10 uses the arithmetic result of the accelerator 20, the accelerator control device 10 accesses a CQ buffer of the metadata buffer 11b and checks whether or not the accelerator 20 transmits metadata (step S6). If there is no metadata in the CQ buffer (No in step S6), the accelerator control device 10 returns processing to step S5. On the other hand, if metadata is present in the CQ buffer (Yes in step S6), the accelerator control device 10 determines notification of completion of the arithmetic processing, acquires the arithmetic result of the processing data from the data buffer 11a, and continues processing (step S7).

If the accelerator 20 is reused (No in step S8), the accelerator control device 10 returns processing to step S2. In this case, the data buffer 11a can be reused. On the other hand, if it is not necessary to reuse the accelerator 20 (Yes in step S8), the accelerator control device 10 releases the area of the data buffer 11a when the application ends (step S9). Accordingly, a series of processing ends.

Figure 7:
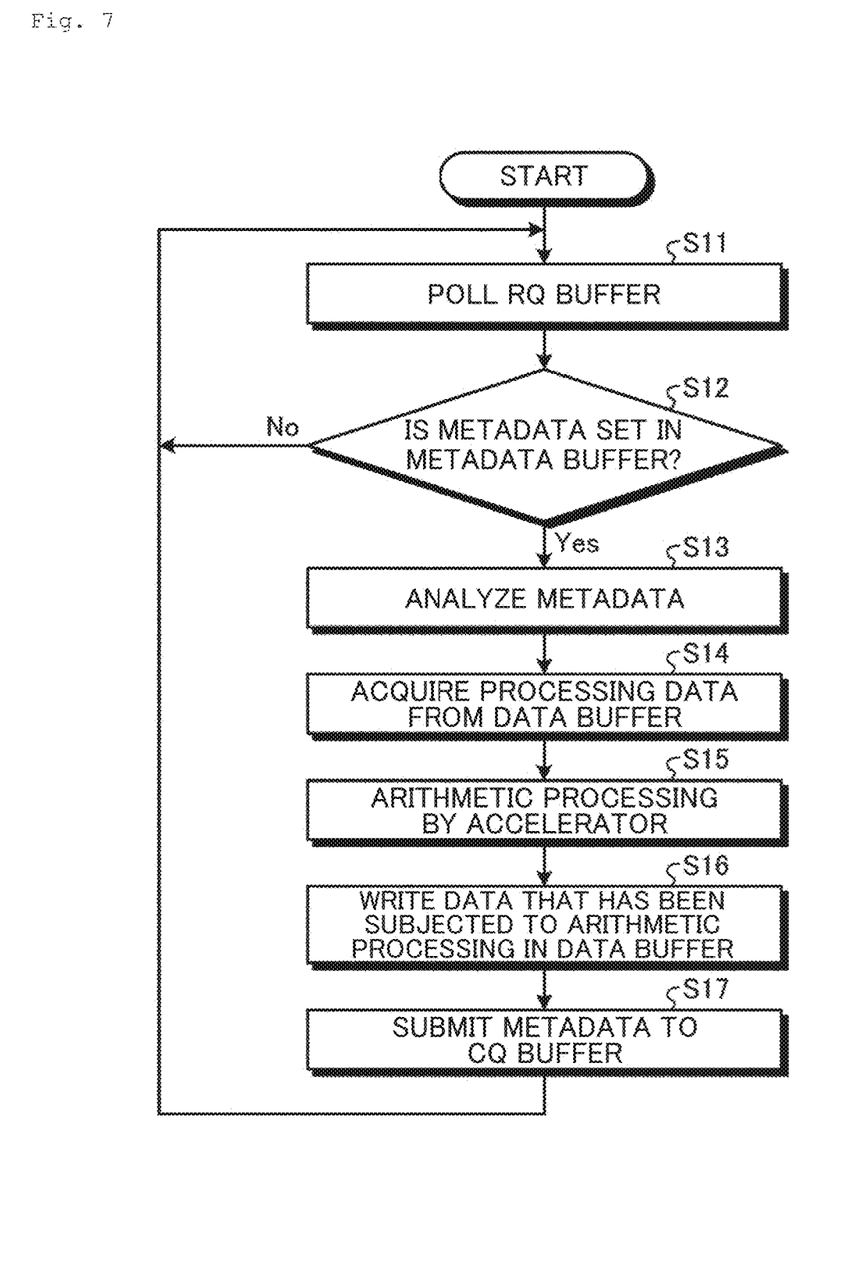
FIG. 7 is a flowchart showing an accelerator control processing procedure in an accelerator.

FIG. 7 is a flowchart showing an accelerator control processing procedure in the accelerator 20. The flowchart of FIG. 7 is started at predetermined intervals, for example. The accelerator 20 monitors the RQ buffer of the metadata buffer 11b by polling (step S11).

If metadata is not set in the RQ buffer (No in step S12), the accelerator 20 returns processing to step S11. On the other hand, if metadata is set in the RQ buffer (Yes in step S12), the accelerator 20 reads the metadata and analyzes it (step S13).

The accelerator 20 acquires processing data of the data buffer 11a on the basis of the analysis result (step S14), and performs arithmetic processing (step S15). Next, the accelerator 20 writes the processing data that has been subjected to arithmetic processing in the data buffer 11a (step S16), transmits the metadata to the CQ buffer (step S17), and ends processing. Thereafter, the accelerator 20 returns processing to step S11.

Figure 8:
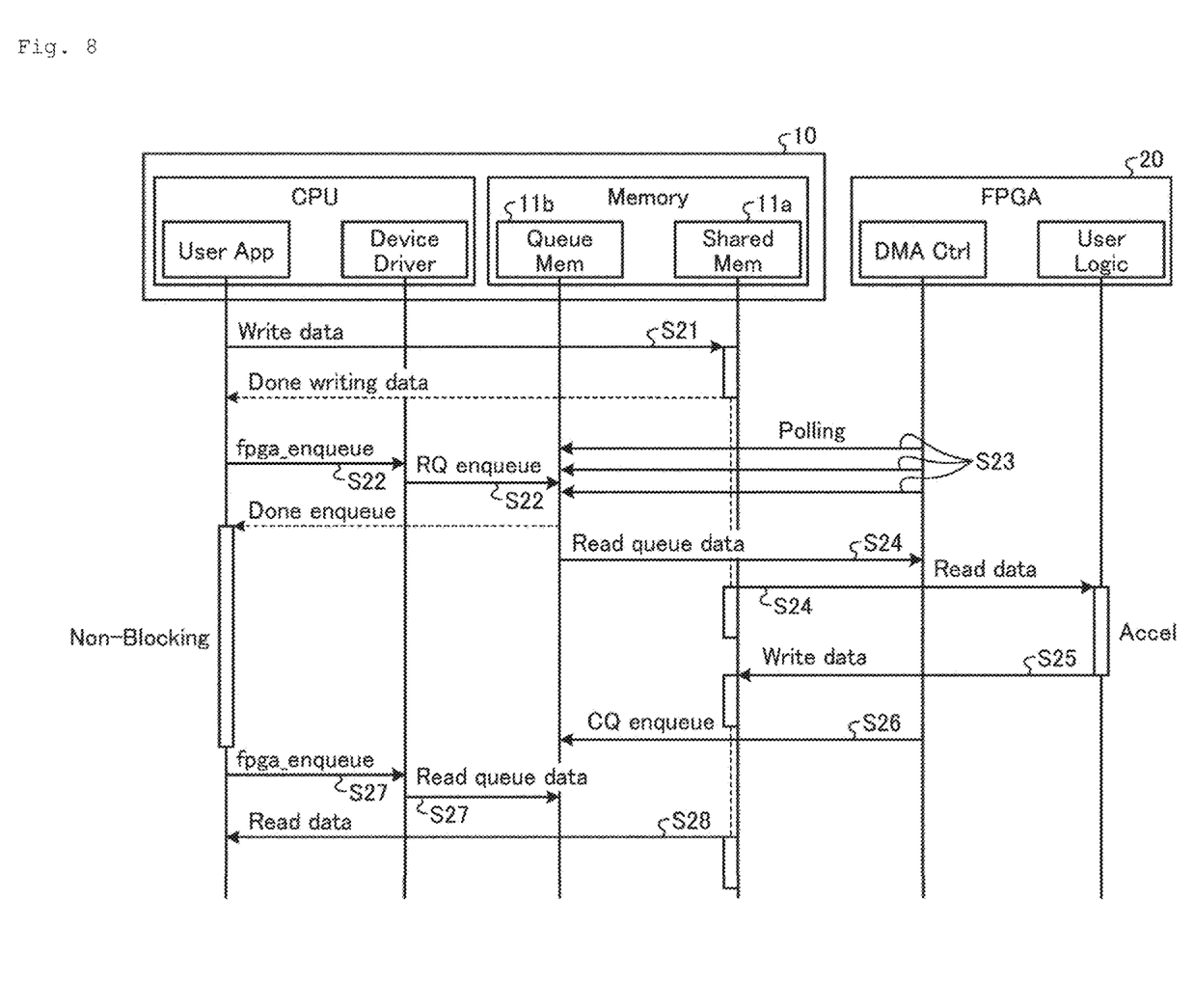
FIG. 8 is a sequence diagram showing an accelerator control processing procedure.

Next, FIG. 8 is a sequence diagram showing an accelerator control processing procedure. In the example shown in FIG. 8, the accelerator 20 is implemented by an FPGA. As shown in FIG. 8, first, the accelerator control device 10 disposes processing data for arithmetic processing in a shared memory space (data buffer 11a) (step S21). In addition, the accelerator control device 10 disposes metadata for the accelerator 20 in an RQ buffer of the metadata buffer 11b in the kernel memory space via the device driver (step S22).

The accelerator 20 monitors whether or not metadata is disposed by polling the RQ buffer (step S23). The accelerator 20 reads the metadata when the metadata is disposed, analyzes processing content written in the metadata and the position of processing data, and reads the processing data (step S24).

The accelerator 20 writes the processing data that has been subjected to arithmetic processing in the data buffer 11a (step S25), and writes the metadata in a CO buffer of the metadata buffer 11b (step S26).

The accelerator control device 10 accesses the CQ buffer to check whether or not metadata is disposed, and senses completion of arithmetic processing of the accelerator 20 when the metadata is disposed (step S27). In this case, the accelerator control device 10 acquires data of the arithmetic processing result from the data buffer 11a (step S28).

[Effects] As described above, in the accelerator control system 1 of the present embodiment, the metadata buffer 11b stores metadata including the location of processing data which is an arithmetic processing target and information specifying the content of arithmetic processing of the accelerator 20 in the accelerator control device 10. The polling function 13a determines completion of the arithmetic processing performed by the accelerator 20 when metadata that has been subjected to the arithmetic processing performed by the accelerator 20 is stored in the metadata buffer 11b. In the accelerator 20, the reading function 21b acquires the metadata from the metadata buffer 11b. The arithmetic function 24 performs arithmetic processing on processing data that is an arithmetic processing target according to the location of the processing data that is an arithmetic processing target and information specifying the operation of the accelerator 20 included in the acquired metadata. When the arithmetic processing is completed, the writing function 21c stores the metadata in the metadata buffer 11b.

Accordingly, the accelerator control system 1 can perform real-time processing at a high speed by reducing an overhead such as exclusive control, interrupt notification of completion of processing, and memory copy in processing using the accelerator 20.

Further, the polling function 21a monitors whether or not metadata is present in the metadata buffer 11b. Accordingly, the accelerator 20 can autonomously perform processing.

Further, the polling function 13a monitors whether or not metadata that has been subjected to arithmetic processing is present in the metadata buffer 11b. Accordingly, the accelerator control device 10 can perform processing asynchronously with the accelerator 20.

The data writing function 23b stores the result of arithmetic processing performed on processing data that is an arithmetic processing target in the data buffer 11a. Accordingly, the accelerator control device 10 can perform processing asynchronously with the accelerator 20 except cases where the arithmetic processing result of the accelerator 20 is used, and thus the speed of processing using the accelerator 20 can be increased.

Further, the metadata buffer 11b stores metadata different for each of the plurality of accelerators 20. Accordingly, scalability according to the plurality of accelerators 20 is improved.

Figure 9:
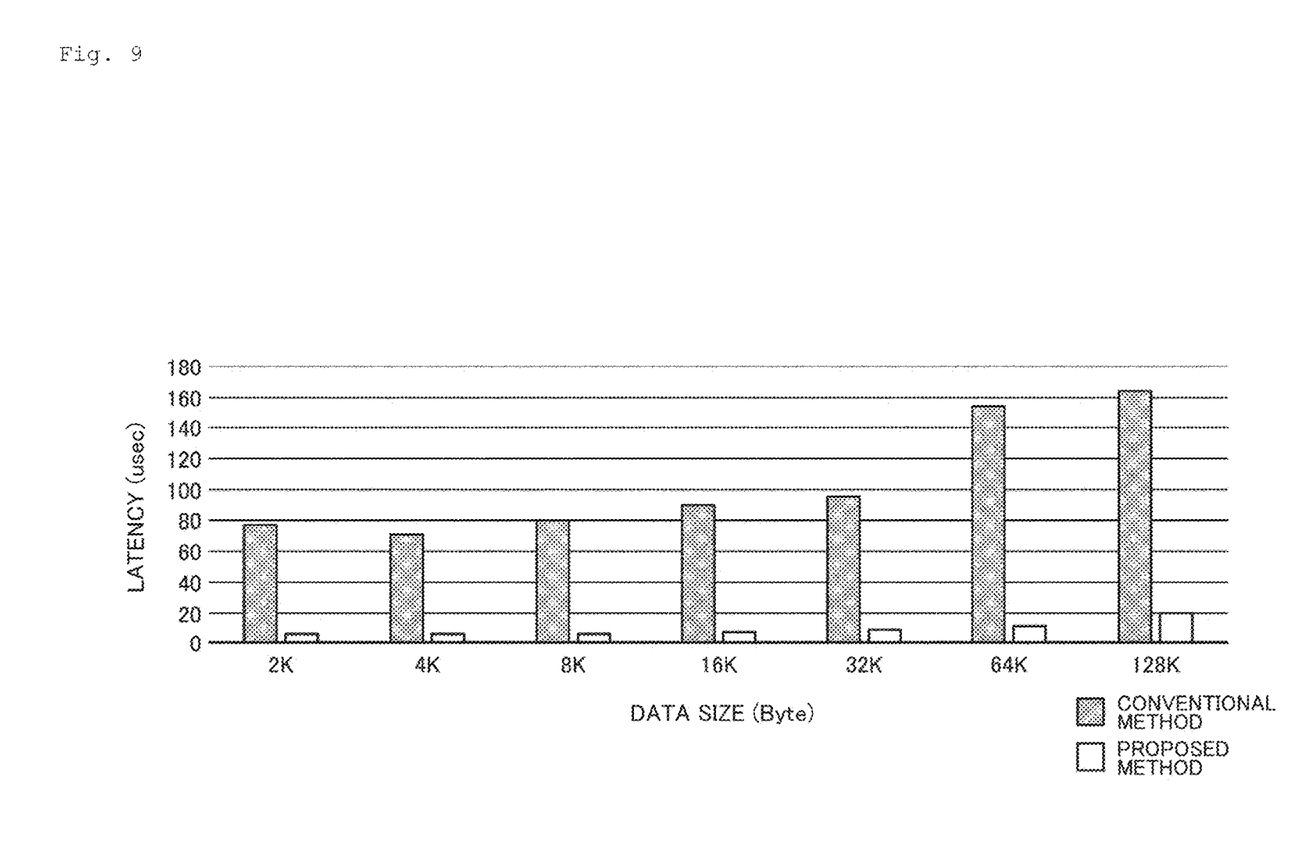
FIG. 9 is a diagram for describing an example.

[Examples] FIG. 9 is a diagram for describing an example. FIG. 9 illustrates measured values of time until processing data returns through loopback from the accelerator control device 10 via the accelerator 20 in processing (proposed method) by the accelerator control system 1 of the above-described embodiment and processing (conventional method) by the conventional technology. In this case, as bus technology, PCIe Gen 3×8 is used in the conventional method, and PCIe Gen 3×16 is used in the proposed method.

FIG. 9 shows that, for example, latency is 20 usec in the proposed method whereas latency is 160 usec or more in the conventional method with respect to 128 Kbyte data. In this manner, it has been confirmed that the proposed method can more increase a processing speed than the conventional method.

[Program] It is also possible to create a program in which processing executed by the accelerator control device 10 according to the above-described embodiment is written in a language executable by a computer. As one embodiment, the accelerator control device 10 can be implemented by installing an accelerator control program for executing the aforementioned accelerator control processing as package software or online software in a desired computer. For example, by causing an information processing device to execute the accelerator control program, the information processing device can be caused to serve as the accelerator control device 10. The information processing device mentioned here includes a desktop type or laptop type personal computer. In addition, the information processing device includes a mobile communication terminal such as a smartphone, a mobile phone or a personal handyphone system (PHS), a slate terminal such as a personal digital assistant (PDA), or the like. Furthermore, the functions of the accelerator control device 10 may be implemented in a cloud server.

Figure 10:
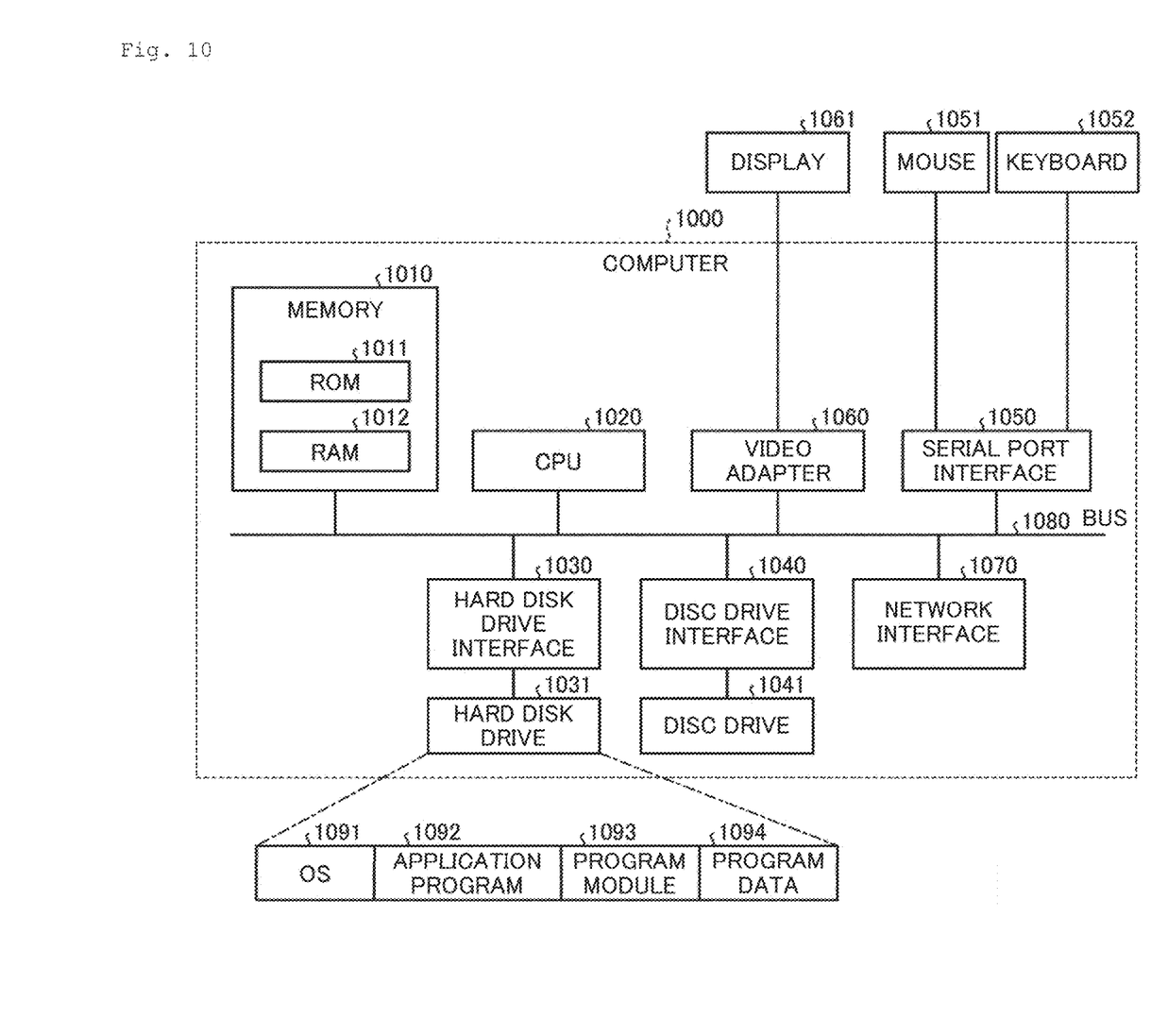
FIG. 10 is a diagram showing an example of a computer that executes an accelerator control program.

FIG. 10 is a diagram showing an example of a computer that executes the accelerator control program. A computer 1000 has a memory 1010, a CPU 1020, a hard disk drive interface 1030, a disc drive interface 1040, a serial port interface 1050, a video adapter 1060, and a network interface 1070, for example. These units are connected through a bus 1080.

The memory 1010 includes a read only memory (ROM) 1011, and a RAM 1012. The ROM 1011 stores, for example, a boot program such as a basic input output system (BIOS). The hard disk drive interface 1030 is connected to a hard disk drive 1031. The disc drive interface 1040 is connected to the disc drive 1041. A removable storage medium such as a magnetic disk or an optical disc is inserted into the disc drive 1041. For example, a mouse 1051 and a keyboard 1052 are connected to the serial port interface 1050. For example, a display 1061 is connected to the video adapter 1060.

Here, the hard disk drive 1031 stores, for example, an OS 1091, an application program 1092, a program module 1093, and program data 1094. Each of the pieces of information described in the above embodiment is stored in, for example, the hard disk drive 1031 or the memory 1010.

Further, the accelerator control program is stored in the hard disk drive 1031 as the program module 1093 in which commands executed by the computer 1000 are written, for example. Specifically, the program module 1093 in which each processing executed by the accelerator control device 10 described in the foregoing embodiment is written is stored in the hard disk drive 1031.

The data used for information processing by the accelerator control program is stored in, for example, the hard disk drive 1031 as the program data 1094. Thereafter, the CPU 1020 reads the program module 1093 and the program data 1094 stored in the hard disk drive 1031 into the RAM 1012 when necessary, and executes each of the procedures described above.

Note that the program module 1093 and program data 1094 related to the accelerator control program are not limited to being stored in the hard disk drive 1031, and may also be stored in, for example, a removable storage medium and read out by the CPU 1020 via the disc drive 1041, etc. Alternatively, the program module 1093 and the program data 1094 related to the accelerator control program may be stored in another computer connected via a network such as a LAN or a wide area network (WAN), and may be read by the CPU 1020 via the network interface 1070.

Although the embodiments to which the invention made by the present inventor is applied have been described above, the present invention is not limited by the descriptions and drawings forming a part of the disclosure of the present invention according to the embodiments. That is to say, other embodiments, examples, operation techniques, and the like made by those skilled in the art on the basis of the embodiment are all included in the scope of the present invention.

REFERENCE SIGNS LIST

10 Accelerator control device
11*a* Data Buffer (storage unit)
11*b* Metadata buffer (storage unit)
12 Memory management function
13 Metadata control function
13*a* Polling function (determination unit)
13*b* Writing function
14 API
20 Accelerator
21 Metadata access mechanism
21*a* Polling function (acquisition unit)
21*b* Reading function
21*c* Writing function (storage unit)
22 Function control block
22*a* Metadata analysis function
22*b* Data transfer control function
22*c* Completion notification function
23 Data transfer function
23*a* Data reading function
23*b* Data writing function (storage unit)
24 Arithmetic function (arithmetic unit)

The invention claimed is:

1. An accelerator control system comprising an accelerator control device and an accelerator,
wherein the accelerator control device includes:
first processing circuitry configured to:
store control data including a location of data which is an arithmetic processing target and information specifying content of arithmetic processing of the accelerator; and
determine completion of the arithmetic processing by the accelerator when the control data which has been subjected to the arithmetic processing by the accelerator is stored in a storage, and
the accelerator includes:
second processing circuitry configured to:
acquire the control data from the storage;
perform arithmetic processing on the data which is an arithmetic processing target according to the location of the data which is an arithmetic processing target and information specifying an operation of the accelerator included in the acquired control data; and store the control data in the storage when the arithmetic processing performed by the second processing circuitry is completed.

2. The accelerator control system according to claim 1, wherein the second processing circuitry is further configured to monitor whether or not the control data is present in the storage.

3. The accelerator control system according to claim 1, wherein the first processing circuitry is further configured to monitor whether or not the control data which has been subjected to the arithmetic processing by the second processing circuitry is present in the storage.

4. The accelerator control system according to claim 1, wherein the second processing circuitry is further configured to store, in the storage, a result of the arithmetic processing performed on the data by the second processing circuitry which is an arithmetic processing target.

5. The accelerator control system according to claim 1, wherein the first processing circuitry is further configured to store control data different for each of a plurality of accelerators.

6. An accelerator control method, comprising:
acquiring control data, the control data including a location of data which is an arithmetic processing target and information specifying content of arithmetic processing of an accelerator;
performing arithmetic processing on the data which is an arithmetic processing target according to the location of the data which is an arithmetic processing target and information specifying an operation of the accelerator included in the acquired control data;
storing the control data when the arithmetic processing is completed; and
determining completion of the arithmetic processing when the control data which has been subjected to the arithmetic processing is stored.

7. A non-transitory computer-readable recording medium storing therein an accelerator control program that causes a computer to execute a process comprising:
acquiring control data including a location of data which is an arithmetic processing target and information specifying content of arithmetic processing of the accelerator;
performing arithmetic processing on the data which is an arithmetic processing target according to the location of the data which is an arithmetic processing target and information specifying an operation of the accelerator included in the acquired control data;
storing the control data when the arithmetic processing is completed; and
determining completion of the arithmetic processing when the control data which has been subjected to the arithmetic processing is stored.

8. The accelerator control method according to claim 6, further comprising:
monitoring whether or not the control data has been stored.

9. The accelerator control method according to claim 6, further comprising:
monitoring whether or not the control data which has been subjected to the arithmetic processing has been stored.

10. The accelerator control method according to claim 6, further comprising:
storing a result of the arithmetic processing performed on the data which is an arithmetic processing target.

11. The accelerator control method according to claim 6, further comprising:
storing control data which is different for each of a plurality of accelerators.

12. The non-transitory computer-readable recording medium according to claim 7, wherein the processing further comprises:
monitoring whether or not the control data has been stored.

13. The non-transitory computer-readable recording medium according to claim 7, wherein the processing further comprises:
monitoring whether or not the control data which has been subjected to the arithmetic processing has been stored.

14. The non-transitory computer-readable recording medium according to claim 7, wherein the processing further comprises:
storing a result of the arithmetic processing performed on the data which is an arithmetic processing target.

15. The non-transitory computer-readable recording medium according to claim 7, wherein the processing further comprises:
storing control data which is different for each of a plurality of accelerators.

* * * * *